Aug. 22, 1950 R. GUNN ET AL 2,519,367
METHOD OF AND APPARATUS FOR DETECTING
DEFECTS IN OBJECTS
Filed July 9, 1945
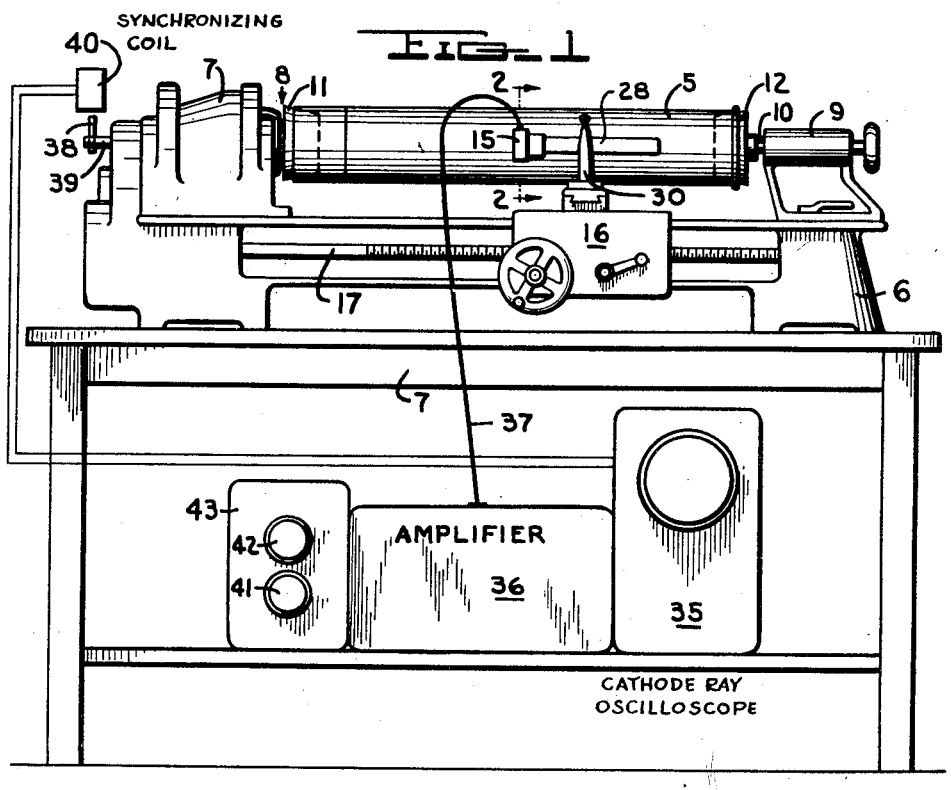
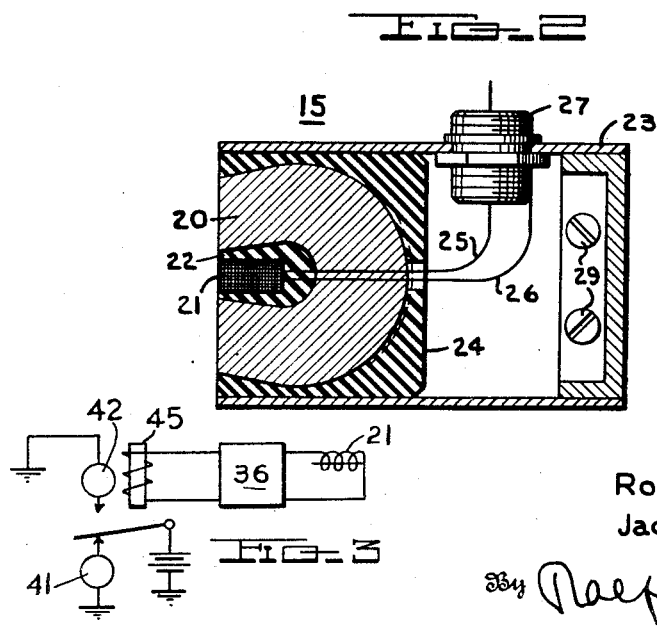
Inventors
Ross Gunn
Jacob E. Dinger
By Ralph L Chappell
Attorney Patented Aug. 22, 1950

2,519,367

UNITED STATES PATENT OFFICE 2,519,367

METHOD OF AND APPARATUS FOR DETECTING DEFECTS IN OBJECTS

Ross Gunn and Jacob E. Dinger, Washington, D. C.

Application July 9, 1945, Serial No. 604,007

1 Claim. (Cl. 175—183)

(Granted under the act of March 3, 1883, as amended April 30, 1928; 370 O. G. 757)

This invention relates to detecting defects in objects, and more particularly to a method of and apparatus for detecting defects in objects formed of electrically conductive material.

In the manufacture of objects it may be of considerable importance that the objects be entirely free of defects or flaws. For example, shell cases which are to be employed as containers for high explosive materials are unsuitable and dangerous if they contain any substantial flaws or defects. Such flaws or defects may consist of surface and sub-surface cracks, irregularities in the size and the axial symmetry of the object, or lack of homogeneity due to variations in the composition, or inclusions of foreign material.

Heretofore, various methods have been employed for detecting flaws and defects in objects, and some of these methods utilize electromagnetic devices based upon the principle that a system of eddy currents induced in metallic objects will have a predetermined configuration if no inhomogeneities are present therein, but if any inhomogeneity is present the predetermined configuration will be altered. By utilizing the electromagnetic fields generated by the eddy currents in their altered configuration for inducing a voltage or current in a suitable exploratory unit, it is possible with these devices to ascertain the presence of a defect. It is a well known fact that the induced eddy currents have a tendency to concentrate near the surface of the objects under test, their magnitude decreasing with increasing depth; and that the relative depth of the eddy current penetration depends, among other things, on the frequency of the induced eddy currents, the penetration increasing with decreasing frequency. In the prior art apparatus and methods the frequency of the induced eddy currents has not been sufficiently low to permit effective penetration into the object under test, nor has the intensity of the induced eddy currents been of adequate magnitude to insure detection at any depth. Furthermore, in the prior art apparatus and methods the voltage or current induced by the electromagnetic field generated by the eddy currents has had the same frequency as the eddy current, which has not always resulted in effective detection.

The prior art deficiencies are effectively overcome in the apparatus and method of the present invention by inducing in the objects under examination eddy currents having substantially constant amplitude and having in effect substantially no frequency component. Thus the depth of penetration of the induced eddy currents is dependent primarily on the intensity of the magnetic field and maximum efficiency is attainable.

An object of the present invention is to provide an efficient and effective method of and apparatus for detecting defects in objects formed of electrically conductive material.

In accordance with one embodiment of this invention, relative movement is established between an object formed of electrically conductive material and a detector unit comprising a pick-up coil located between the poles of a bipolar magnet, the detector unit being so positioned relatively to the object being examined as to induce eddy currents of constant amplitude therein provided no inhomogeneities are present. A flaw or defect in the object, since it changes the resistance in that area will, however, alter the normal induced eddy current pattern in the object and this variation in the induced pattern is detected by the coil and made to indicate the presence of the flaw or defect through an associated indicating device.

Other objects and advantages of the present invention will be apparent from the following detailed description, taken in conjunction with the drawings, wherein:

Fig. 1 is a side elevation of an apparatus employed in accordance with one embodiment of this invention, having a detector unit constructed in accordance with this invention associated therewith; and, Fig. 2 is a detail, sectional view, partly in elevation, taken along the line 2—2 of Fig. 1 showing the detector unit in detail.

Fig. 3 is a block diagram of the control circuit for the signal lamps.

Faraday's Law of magnetic induction states that the electromotive force acting around a closed circuit is equal to the time rate of change of flux through that circuit. If the closed circuit is a conducting medium, there will flow an electric current which is proportional to the conductivity of the material and the time rate of change of the flux. Electrical currents so induced in a conducting material are often referred to as eddy currents.

Eddy currents are induced into a conducting material by (1) a time rate of change of the magnetic field through the material, by (2) a relative motion of the conducting material and a magnetic field, or by (3) a combination of (1) and (2). Because the magnitude of the induced eddy currents is dependent upon the resistance of the equivalent conducting path, these currents offer a method of detecting electrical discontinuities in a conducting material.

The axial symmetry of a cylinder, such as a shell case, or a cylindrical shaft, or a tube makes possible an effective method of producing eddy currents in the structure by simply rotating the structure in the field of a magnet. It will be apparent that an axially symmetrical cylinder having a surface of uniform conductance and rotating with a uniform velocity in the field of a magnet will have a definite eddy current pattern established in the region of the cylinder adjacent the magnet so that a constant magnetic flux will link a pickup coil disposed between the poles of the magnet. However, if the structure contains a flaw such as a crack, since such a flaw is a definite electrical discontinuity which raises the resistance of the equivalent path of the region, the normal eddy current pattern is momentarily altered as the flaw passes the magnet, so that a changing magnetic flux links the coil. This momentary change in flux through the coil induces an electro-motive force in the coil which in turn may be made, in accordance with the present invention, to indicate the presence of the flaw.

Referring now to the drawings, and particularly to Fig. 1 thereof, it will be seen that this apparatus includes an apparatus for effecting relative movement between an object to be examined and a detecting device, so that the detecting device will scan every part of the surface of the structure. Whether the relative movement be effected by moving the structure relatively to the detecting device, by moving the detecting device relatively to the structure, or by moving both simultaneously is a matter of choice and will depend primarily on what method is most satisfactory in a particular case. Thus, for purposes of illustration only, an apparatus is shown in Fig. 1 wherein the structure is rotated about its axis while the detecting device is moved longitudinally relatively to the rotating structure. The rotating apparatus shown may be essentially a lathe of standard design and comprises a bed 6, on the left end of which, as viewed in Fig. 1, is mounted a headstock 7 having a rotatable spindle 8 associated therewith, and on the right end of which is mounted a tailstock 9 provided with a dead center 10. Suitable means, not shown, may be provided for driving the headstock spindle and the bed 6 may be mounted on the upper surface of a table 7.

In employing this apparatus, the object to be examined, such as a shell case or a shaft, is mounted between the headstock 7 and the tailstock 9 so as to be rotated about its axis by the headstock spindle 8. A suitable method of mounting a structure 5 for rotation by the lathe is shown in Fig. 1 wherein a headstock chuck 11 is provided for engaging one end of the object while a tailstock chuck 12 is provided for engaging and centering the opposite end of the structure 5. In the case of a hollow cylindrical structure such as a shell case these chucks may consist of cone-shaped pieces, as shown, of the correct diameter to partially enter, respectively, the base and mouth of the cylinder and the cones are made of a non-metallic, insulating material, such as Bakelite, so that false indications will not be given as the ends of the cylinder are scanned. Where a solid shaft is to be mounted in the lathe, it will be understood that a chuck adapted for peripherally engaging the shaft would be employed.

In the case of an object of uniform cross-section throughout its length, the detector unit, shown in Fig. 2 and designated generally as 15, may be mounted on a carriage 16 which is in turn mounted on and moved longitudinally relatively to the lathe bed 6 by a driven lead screw 17 mounted parallel to the lathe axis. The lead screw 17 is connected through suitable gearing or pulleys, not shown, to the driving means for the spindle 8 and thus causes the carriage 16 to traverse the length of the structure being examined at a speed proportional to the speed of rotation of the structure. In the case of a structure having a taper, the lead screw must be mounted at an angle to the lathe axis, or other means provided, so that the detector unit will travel parallel to the surface of the structure in order to maintain a constant air gap between the face of the detector unit and the revolving structure as the detector unit moves along the structure.

Referring now to Fig. 2, wherein the detector unit 15 is shown in detail, it will be seen that this unit comprises a bi-polar magnet 20, which may be made of a permanent magnetic material and be of U-shape. A suitable electromagnet may be employed instead of a permanent magnet. A pick-up coil 21 is mounted between the poles of the magnet 20 with the axis of the coil parallel to the legs of the magnet and the coil is held securely in position therebetween, as by filling the region surrounding the coil with an insulating material 22 such as wax. A housing 23, which may be of rectangular box-like construction and is preferably made of a material which will provide a high degree of electrostatic shielding, encloses the sides and rear of the magnet and coil assembly and, as shown in Fig. 2 a plate 24 may be mounted transversely across the mid-portion of the interior thereof so that the magnet itself may be embedded in a suitable supporting material by simply positioning the magnet and coil in the housing and casting a supporting material such as wax into the housing, the plate 24 serving to prevent the casting material from entering the rear portion of the housing. It will be understood, however, that this method of supporting the coil and magnet is merely illustrative and that any suitable method may be employed.

Electrical connection may be made to the coil 21 by two leads 25 and 26 which are connected respectively to the two ends of the coil, extend through the plate 24, and are connected to a terminal 27, which may be of the coaxial type, and which is mounted in a sidewall of the housing 23. A supporting rod 28 is fixed to a side of the housing 21 as by screws 29 and in the embodiment shown the rod 28 extends substantially at right angles therefrom to facilitate mounting the detector unit in a clamp support 30 associated with the lathe carriage 16.

From the foregoing discussion and description it will be apparent that when an axially symmetrical structure 5 of electrically conductive material is mounted, as described, on the lathe shown in Fig. 1, and is rotated by the lathe relatively to a detector unit 15 mounted on the carriage 16, a definite eddy current pattern will be produced in the structure 5. A change in the electrical continuity of the structure, that is a flaw, will change this eddy current pattern and thus cause an electromotive force to be induced in the coil 21. In accordance with this invention, the momentary electromotive force produced by the flaw interrupting the normal eddy current pattern is utilized to indicate the presence of a flaw. This may be done in a number of ways such as by a suitable meter or a trigger circuit operable in the event of a voltage from the coil to actuate an indicating device. Such devices are well known. However, it has been found that by employing an oscilloscope 35 having a linear sweep synchronized with the rotation of the structure and connecting the coil 21 to the oscilloscope so as to cause a deflection of the electron beam in known manner upon the occurrence of a change in the induced voltage, a high degree of accuracy and facility is afforded in the operation of this apparatus. The oscilloscope 35 may have associated therewith an amplifier 36 of any known or other suitable form to increase the sensitivity of the detector unit, the amplifier being connected to the detector unit coil as by a shielded cable 37.

In order to synchronize the sweep of the oscilloscope trace with the rotation of the structure 5 so that for each revolution there will be one sweep, a small bar magnet 38 is mounted on an extended portion 39 of the spindle shaft and a coil 40 is positioned adjacent the path of the end of the magnet 38 so that as the magnet 38 revolves past the coil, a voltage will be induced in the coil. By connecting the coil 40 to the oscilloscope, this voltage may be used to determine the starting point of the sweep on the oscilloscope. Since the angular position of the revolving magnet 38 determines what point on the cylinder is passing the detector unit at the time the linear sweep of the oscilloscope is initiated, the relative position of a flaw may be determined from the position of the "pip" produced by the voltage pulse from the detector unit deflecting the otherwise linear sweep.

It has been found that when using this apparatus a signal is induced in the detector unit by a structure which is off round, as well as by a structure having defects or flaws such as cracks. Such a signal has a frequency similar to the frequency of rotation of the structure and will result in an undesirable distortion of the base line of the oscilloscope in the pattern. Where it is desired to eliminate this type of indication from the oscilloscope, it will be understood that a suitable filter which discriminates against a low frequency signal, of the nature described, may be incorporated in the circuit between the detector unit and the oscilloscope.

In addition to an indication of a flaw by an observation of the oscilloscope pattern, the present apparatus may be employed to give a warning signal to the operator when a flaw is present. A pair of signal lights 41 and 42 may be provided and mounted in a panel 43. A suitable control circuit may be associated with the lights 41 and 42 as diagrammatically shown in Fig. 3, so that, for example, the light 41 is normally on but when a flaw occurs, the control circuit, which may be connected through the amplifier 36, is actuated through a suitable relay 44 to turn off the light 41 and turn on the light 42 thus indicating the presence of a flaw. By incorporating a time delay circuit 45 of any known or other suitable form, the light 42 may be made to remain on for a suitable period.

It is apparent that either the warning light or the oscilloscope may be used to indicate the presence of a flaw, but since the oscilloscope gives information concerning the nature of the flaw not otherwise obtainable and the warning light gives assurance that the flaw will not be passed over quickly and thus escape the attention of the operator, as could easily be the case if the oscilloscope pattern alone were used to indicate the presence of a flaw, it is desirable to use the two methods to supplement one another.

The depth, width and orientation of a flaw are factors which influence the magnitude and wave form of the signal of a given flaw. A longitudinal, tightly closed crack, completely through the wall of a cylinder, will give a signal having the greatest peak voltage. Because the nature of the flaw signal is dependent upon these factors it is difficult to calibrate the apparatus so that the approximate depth of the flaw can be determined. However, it has been found that an experienced operator can interpret the oscilloscope pattern and thus gain much information concerning the nature of the flaw.

While this apparatus is applicable to the testing of objects either hollow or solid, it will be understood that the sensitivity of the test will depend on the depth of penetration of the magnetic field. By employing as the magnetic material, a suitably high strength magnetic material, such as some of the Alnico alloys, considerable penetration may be obtained. Since this apparatus does not depend upon magnetizing the object being tested, objects made of non magnetizable material such as brass or aluminum may be easily tested in this apparatus.

While this invention has been described primarily in conjunction with the detection of defects in axially symmetrical structures such as tubes, rods, or cylinders, it will be understood that the method of this invention is equally applicable to the testing of an asymmetrical object by employing suitable means for establishing relative movement between the object being examined and the detector unit and for maintaining a constant spacing between the detector unit and the periphery of the object being examined.

While but one embodiment of this invention has been shown and described it will be understood that many changes and modifications may be made without departing from the spirit or scope of the present invention.

The invention shown and described herein may be manufactured or used by or for the Government of the United States of America for governmental purposes without the payment of any royalties thereon or therefor.

What is claimed is:

An apparatus for testing axially symmetrical objects of electrically conducting material comprising means for rotating said object about its axis of symmetry, a detector unit having a U-shape bipolar permanent magnet situated at one side only of the object with both its pole faces lying in a plane close to but wholly to one side of the object, whereby the field of the magnet is concentrated mainly in one side of the object, a detector coil forming a part of said detector unit located between the arms of the U-shaped magnet and wholly to one side of the object, means for moving the detector unit longitudinally relative to the axis of rotation of the object, and means for indicating an electromotive force in said detector coil.

ROSS GUNN.
JACOB E. DINGER.

REFERENCES CITED

The following references are of record in the file of this patent:

UNITED STATES PATENTS

| Number | Name | Date |
|---|---|---|
| Re. 21,927 | Brace et al. | Oct. 21, 1941 |
| 1,459,970 | Burrows | June 26, 1923 |
| 2,195,504 | Stone | Apr. 2, 1940 |
| 2,255,053 | Gunn | Sept. 9, 1941 |
| 2,295,382 | Brace | Sept. 8, 1942 |
| 2,467,306 | Habig | Apr. 12, 1949 |

OTHER REFERENCES

Journal of Applied Mechanics (Trans. A. S. M. E.) Mar. 1941, vol. 8, No. 1, pages A-22 to A-26.